United States Patent
Peoples et al.

(10) Patent No.: US 10,513,441 B2
(45) Date of Patent: Dec. 24, 2019

(54) METHOD FOR PRODUCING MAGNESIUM ALUMINATE SPINELS

(71) Applicant: Sasol (USA) Corporation, Houston, TX (US)

(72) Inventors: Brian Peoples, Westlake, LA (US); Allison Hann, Westlake, LA (US)

(73) Assignee: Sasol (USA) Corporation, Houston, TX (US)

( * ) Notice: Subject to any disclaimer, the term of this patent is extended or adjusted under 35 U.S.C. 154(b) by 0 days.

(21) Appl. No.: 15/752,052

(22) PCT Filed: Sep. 6, 2016

(86) PCT No.: PCT/US2016/050402
§ 371 (c)(1),
(2) Date: Feb. 12, 2018

(87) PCT Pub. No.: WO2017/044423
PCT Pub. Date: Mar. 16, 2017

(65) Prior Publication Data
US 2018/0237308 A1    Aug. 23, 2018

Related U.S. Application Data

(60) Provisional application No. 62/215,798, filed on Sep. 9, 2015.

(51) Int. Cl.
*C01F 7/16* (2006.01)
*C04B 35/443* (2006.01)
*C04B 35/626* (2006.01)

(52) U.S. Cl.
CPC ............ *C01F 7/162* (2013.01); *C04B 35/443* (2013.01); *C04B 35/6263* (2013.01); *C04B 35/62655* (2013.01); *C01P 2002/32* (2013.01); *C04B 2235/3218* (2013.01); *C04B 2235/44* (2013.01)

(58) Field of Classification Search
CPC ... C01F 7/162; C04B 35/443; C04B 35/6263; C04B 35/62655
See application file for complete search history.

(56) References Cited

U.S. PATENT DOCUMENTS 4,728,635 A * 3/1988 Bhattacharyya ....... B01J 23/005
                                                              423/244.02
9,340,432 B2 * 5/2016 Peoples ................. C04B 35/443

FOREIGN PATENT DOCUMENTS

EP    0178837    4/1986
EP    0371211    6/1990

OTHER PUBLICATIONS

Montouilloust, V., et al., Characterization of MgAl2O4 Precursor Powders Prepared by Aqueous Route, J. Am. Ceram. Soc., vol. 82, No. 12, 1999, pp. 3299-3304.

* cited by examiner

*Primary Examiner* — James A Fiorito
(74) *Attorney, Agent, or Firm* — Bushman Werner, P.C.

(57) ABSTRACT

A process for producing a magnesium aluminate spinel comprising the steps of: i) preparing a magnesium suspension containing a magnesium compound; ii) preparing an aluminum suspension containing an aluminum compound; iii) feeding the magnesium suspension and aluminum suspension independently into a spray dryer nozzle to form a mixed magnesium, aluminum suspension; iv) feeding the mixed magnesium, aluminium suspension from the spray dryer nozzle into a spray dryer to form a mixed magnesium and aluminum compound; and v) calcining the mixed magnesium and aluminum compound to generate a magnesium aluminate spinel.

15 Claims, No Drawings

METHOD FOR PRODUCING MAGNESIUM ALUMINATE SPINELS

CROSS REFERENCE TO RELATED APPLICATION

This application claims priority to U.S. Application No. 62/215,798 filed on Sep. 9, 2015, the disclosure of which is incorporated herein by reference for all purposes.

FIELD OF THE INVENTION

The present invention relates to spinels and more particularly to the production of magnesium aluminate spinels.

BACKGROUND OF THE INVENTION

Spinets, in general, are a class of minerals having the general formula $A^{2+}B_2^{3+}O_4^{2-}$. Aluminum spinels include natural spinels, $MgAl_2O_4$, gahnite, $ZnAl_2O_4$, and hercynite, $FeAl_2O_4$. Although spinels are found in nature, because of the increasing demand synthetic spinels are now being made by various methods.

Presently, spinels are used as windows and domes in high-speed missiles and pods. Although silicate glasses are suitable for most common window uses, they are too weak to be used in the latter applications. A magnesium aluminate spinel is a polycrystalline ceramic material that has excellent optical and mechanical properties.

In the spinel technology area, it is well known that the production of high purity, high transparency spinels is generally accomplished by coprecipitation of aluminum and magnesium salts. This can be accomplished by various means including by milling aluminum and magnesium compounds together to obtain a homogeneous mixture of materials, or simply wet mixing high purity aluminum and magnesium compounds. In other words a spinel containing suspension including both the magnesium compound and the aluminum compound is prepared. This compound suspension(s) may then be hydrothermally aged. A drying step followed by a calcination step then occurs. The drying step typically includes spray drying. Spray drying is a well known technique and sophisticated spray driers with various nozzle types are known.

To be noted however, is that when making spinels it is the magnesium, aluminum containing suspension that is fed into a spray dryer. This method is disclosed, for example in the following documents; V. Montouillout et al., J. Am. Ceram. Soc. 82(12) 3299-304 (1999), G. Lallemand et al., J. Eur. Ceram. Soc. 18(14) 2095-2100 (1998), and W. K. Zhang et al., J. of Alloys and Compounds 465 250-254 (2008).

Prior art discloses the use of spray drying equipment that includes nozzles that can combine two liquid streams. The prior art discloses that the two liquid streams are allowed to be of different compositions, for example, solvents of different boiling points or reactant solutions. The prior art discloses that plugging of the nozzles is a problem and offers various solutions of improved nozzles to address this problem. However in the spinel technology area as explained above, it is the mixed aluminum and magnesium containing suspension that is fed into the spray dryer. This is because many synthetic routes for spinel include precipitation from magnesium and aluminium salts. The high concentration and aggressive nature of the salts limits the materials of construction, and the in situ precipitation of the materials has deleterious effects on the dryer due to the propensity of the suspension to gel under many conditions. Even in the cases of mixed oxides, which are generally less reactive, the materials are generally premixed when spray dried for viscosity control reasons. Without careful control of the suspensions, there is a tendency for the materials to thicken rapidly.

The inventors of the present invention have also found that these prior art spinel production processes are problematic during scale up, i.e. to an industrial or commercial scale. Without wishing to be bound to any theory, it is believed that this is due to a limited weight loading at which the aluminum and magnesium containing suspension can be processed by a spray dryer. Typically the suspension can only be made at up to 7 to 9 wt. % loadings before the nozzles begin to plug or the suspension becomes too viscous to pump. Such a low loading limit creates a bottleneck at the spray drying phase and thus increases the time required to produce commercial quantities of the spinels.

SUMMARY OF THE INVENTION

According to the invention, there is provided a process for producing a magnesium aluminate spinel comprising the following steps:
  i) preparing a magnesium suspension containing a magnesium compound;
  ii) preparing an aluminum suspension containing an aluminum compound;
  iii) feeding the magnesium suspension and aluminum suspension independently into a spray dryer nozzle to form a mixed magnesium, aluminum suspension;
  iv) feeding the mixed magnesium, aluminium suspension from the spray dryer nozzle into a spray dryer to form a mixed magnesium and aluminum compound; and
  v) calcining the mixed magnesium and aluminum compound to generate a magnesium aluminate spinel.

One of the advantages of this process is the use of highly dispersible aluminum and magnesium compounds which allow for a controlled increase in viscosity. The materials are prepared in such a way that the time required for a substantial viscosity increase to occur following the suspensions coming into contact and mixing is greater than the time required for the material to pass through the spray dryer nozzle or atomizer assembly.

The magnesium suspension and the aluminum suspension may be fed into the spray dryer by a spray dryer nozzle which may include at least two inlets, e.g., a 3-fluid spray drying nozzle or a Y-feed line spray dryer nozzle that allows the separate magnesium and aluminum suspensions to be fed independently into the spray dryer nozzle where they are combined and fed out into the spray dryer as a mixed magnesium aluminum suspension.

A pump system including a peristaltic pump or positive displacement pump may be used to pump the suspensions through the feeding means.

The aluminum compound may include aluminum oxyhydroxide, aluminum oxide, aluminum hydroxide, or mixtures thereof. The aluminum compound is preferably selected from Boehmite, Bayerite, Gibbsite, gamma-alumina, transitional (delta-theta) aluminas and mixtures thereof. More preferably, the aluminum compound is selected from suspensions of boehmite and gamma-aluminas, and is most preferably ultra-high purity boehmite.

The magnesium compound may include magnesium oxides and salts. These magnesium oxides and salts may include magnesium hydroxide, magnesium carbonate, magnesium oxide, magnesium acetate, magnesium nitrate, magnesium chloride, magnesium formate, and magnesium acetate. The magnesium compound is more preferably magnesium oxide or magnesium hydroxide, and is most preferably magnesium hydroxide.

The magnesium suspension is dispersed for a period of 20 to 50 min, preferably a period of 25 to 35 min and most preferably a period of 30 min.

As noted above, there is a direct relationship between the time and the rheology for a mixed aluminum, magnesium suspension i.e. the longer the magnesium and aluminum precursors are in contact, the greater the viscosity of the mixed aluminum, magnesium suspension. Accordingly, the present invention seeks to limit the contact to a short period of time. This will ensure the mixed aluminum, magnesium suspension does not become viscous and therefore does not plug the nozzles. The exact amount of time needed to prevent the viscosity varies based on the nature of the aluminum or magnesium compound(s) and may be as short as a few seconds or as long as a few minutes.

By separating the suspensions into independent streams it is possible to achieve higher loading during the drying phase whilst producing spinel containing materials which effectively convert into spinels after calcination. By using this improved process effective weight loadings of higher than 10% can be achieved, preferably effective weight loading of higher than 20% can be achieved, and more preferably weight loadings of up to or higher than 22% can be achieved when spray drying whilst still obtaining a high conversion rate. Furthermore, the use of two independent feed suspensions provides the ability to vary the composition of the product by changing the feed rate of each suspension. This is particularly useful in responding to real time process data. In order to produce commercially useful homogeneous lots of material, the batch process typically requires several hundred gallons of suspension containing the aluminum and/or magnesium compounds. As the stoichiometry of the materials can vary slightly, the overall chemistry may require adjustment based on real time data. In prior art processes, this was difficult due to the viscous nature of the feed suspension, and the limited ability of the stirring system to incorporate newly introduced powders into the existing suspension. In most cases it is difficult to accurately modify the stoichiometry of a batch based on real time in-process data.

The use of two independent feed lines in the present invention however, permits adjustment of the stoichiometry by adjusting the delivery rate of separate aluminum and magnesium containing suspensions either by varying the pumping rates or the adjustment of other aspects of the system for example, backpressure on the line.

For instance, if the real time in-process data indicates that the $MgO:Al_2O_3$ is MgO deficient, the pumping rate of the Mg containing suspension can be increased to compensate. Examples of the feed rate modifications used to control the MgO levels in the product are shown in Table 1. In this particular run, the initial in-process data (sample A) showed that the MgO in the product was low, adjustment of the magnesium suspension pumping rate by 1 mL/min while maintaining the aluminum suspension pumping rate constant resulted in an increased MgO concentration (sample B). The pumping speed of the alumina suspension was then decreased by 2 mL/min while the pumping speed of the magnesium suspension was increased 1 mL/min. This resulted in an increase in the MgO concentration to 27.8% (sample C).

TABLE 1

Effect of pumping speed on MgO concentration.

| | Pump Speed (mL/min) | | |
|---|---|---|---|
| In-process sample | Aluminum Suspension | Magnesium Suspension | % MgO in product |
| A | 11 | 11 | 21.4 |
| B | 11 | 12 | 23.1 |
| C | 9 | 13 | 27.8 |

The in process data can be provided by thermal analysis, ICP, or even x-ray methods.

It is also important to note that high conversion rates, up to 96% are obtained using this process.

These and further features and advantages of the present invention will become apparent from the following detailed description.

DETAILED DESCRIPTION OF PREFERRED EMBODIMENTS

The invention is related to a process of making a magnesium aluminate spinel which includes an aluminum suspension and a magnesium suspension. The process begins with the preparation of the aluminum suspension and the magnesium suspension.

The production of the aluminum containing suspension includes dispersing an aluminum compound in an aqueous solution to form an aluminum suspension.

The aluminum compound can be milled prior to use to improve dispersibility.

An acidic solution including formic acid, acetic acid, citric acid, nitric acid, hydrochloric acid, oxalic acid, butanoic acid, or sulfuric acid may be added to the aqueous solution in amounts of 0.001-10 wt. %. It is preferable that the acidic solution is added as a dilute solution rather than at high concentrations. It is further preferable to add the acidic solution to the aqueous solution before dispersing the aluminum. The aluminum suspension has a pH of about 3-5.

Preparing the magnesium suspension includes for example an aqueous suspension of $Mg(OH)_2$. The magnesium suspension has a pH of about 8-9.

A base may be added to the aluminum suspension and to the magnesium suspension to increase their pH. The base preferably includes ammonium hydroxide. The ammonium hydroxide is added to the aluminum suspension and the magnesium suspension after about 30 minutes to increase the pH of the suspensions to a pH of 8 to 10. The base is added in amounts of 0.001 to 0.5 wt. % of the suspensions. It is preferable if the base is added as a dilute solution rather than at high concentrations.

The magnesium suspension is to be dispersed for a specified time. The magnesium suspension may be dispersed for between 20 to 50 min, preferably 25 to 35 min and most preferably for 30 min.

As is well known by those skilled in the art, typical processes of producing spinels involve a drying step. The drying can be by means of direct or indirect heating methods. These methods may include spray dryer, contact dryer, or pan dryer. A preferred method is spray drying.

Drying takes place at various temperatures depending on the drying technique used. Larger dryers are operated at inlet temperatures of between 350° C. to 400° C. and outlet temperatures of 100-105° C., whilst smaller dryers are operated at inlet temperatures of about 275° C. and outlet temperatures of 100-105° C. outlet temperatures.

The magnesium suspension and the aluminum suspension are fed into a spray dryer nozzle separately by use of a spray dryer nozzle including at least two feed lines. Examples of nozzles that can be used are a 3-fluid nozzle or a Y-feed inlet line. The mixing of the two suspensions occurs in short time following their contact in the spray dryer nozzle or in the atomizer body in the nozzle. The resulting mixed magnesium, aluminum suspension is then fed into the spray dryer.

With the production of spinels the homogeneity is critical, and inadequate mixing usually results in poor conversion to spinel upon calcination. What is surprising with this process is that comparable results are achieved in only the short amount of time from when the suspensions are contacted in the spray dryer atomizer to when they exit the spray drying nozzle/atomizer within the spray drying nozzle, i.e., on the order of minutes rather than the hour(s) required using a batch process.

The magnesium aluminum mixed compound can be calcined to spinel by heating in a furnace at 1200° C. for 4 hours or 1375° C. for 2 hrs. Commercially the spinel is calcined over 8 hours to a max temperature of 1200° C.

The invention will now be exemplified according to the following non-limiting example(s).

Example 1

A magnesium suspension of 40.6 g $Mg(OH)_2$ in 239.9 g DI water was prepared and stirred. The magnesium suspension was then dispersed for 30 min. Simultaneously an aluminum suspension of Pural® UHPA SB1 was prepared using 97.8 g of boehmite and 239.9 g of DI water and stirred. After stirring for ca. 30 minutes, the boehmite was filtered through a 40 μm screen to eliminate any large aggregates. Each suspension was fed independently through a Buchi 3-fluid nozzle via a peristaltic pump. The mixed magnesium and aluminum suspension was then fed into a spray dryer. The process permitted drying at 22 wt. % solids and produced mixed oxides which achieved high conversion greater than or equal to 95% upon calcination.

Example 2

A magnesium suspension of 121.8 g $Mg(OH)_2$ in 719.8 g DI water was prepared and stirred. The magnesium suspension was then dispersed for 30 min. Simultaneously, an aluminum suspension of Pural® UHPA SB1 was prepared using 293.4 g of boehmite and 719.8 g of DI water and stirred. The pH of both suspensions was adjusted to 10 using an ammonium hydroxide solution. Each suspension was fed independently through a Y feed line into the dryer via a peristaltic pump. The process permitted drying at 21 wt. % solids and produced materials which achieved high conversion greater than or equal to 95% upon calcination.

Comparative Example 1

A suspension of 406 g of $Mg(OH)_2$ in 2000 g of DI water was brought to a pH of 10 using ammonium hydroxide and stirred on the bench top for 45 minutes. Simultaneously a suspension of Pural® UHPA SB1 was prepared using 926 g of boehmite and 17000 g of water. The pH of the aluminum suspension was adjusted to 4 using formic acid and stirred on the bench top for 30 minutes. The pH of the aluminum suspension was adjusted to 10 using 5 wt % ammonium hydroxide. Once the pH was reached, the aluminum suspension was stirred for 15 minutes. The suspensions were then combined by pouring the pH 10 boehmite suspension into the pH 10 $Mg(OH)_2$ suspension. The two were blended together well and pumped into the atomizer of the spray dryer, via a peristalic pump. When the boehmite is rehydrated and introduced to the $Mg(OH)_2$ suspension, a high conversion greater than or equal to 96% can be achieved upon calcination, however the process only permitted 7% weight loading.

Comparative Example 2

A magnesium suspension of 40.6 g $Mg(OH)_2$ in 239.9 g DI water was prepared and stirred. The magnesium suspension was then dispersed for 30 min. Simultaneously an aluminum suspension of Pural® UHPA SB1 was prepared using 97.8 g of boehmite and 239.9 g of DI water, pH adjusted to 4 using formic acid, and stirred. After stirring for ca. 30 minutes, the boehmite suspension was filtered through a 40 μm screen to eliminate any large aggregates. The $Mg(OH)_2$ suspension was then added to the stirring boehmite suspension. The mixed magnesium and aluminum suspension was then fed into a spray dryer. While the process permitted drying at 22 wt. % solids, the mixed oxides produced achieved poor conversion of less than or equal to 23% upon calcination. The low conversion rate is due to improper blending of the magnesium and aluminum suspensions.

The results of the above Examples are included in Table 2 hereunder:

TABLE 2

| | Preparation | Al Containing suspension | Mg Containing suspension | Weight loading | Conversion % |
|---|---|---|---|---|---|
| Example 1 | Buchi nozzle | UHPA SB1 | $Mg(OH)_2$ | 22.3 | 96.6 |
| Example 2 | Y feed line | UHPA SB1 | $Mg(OH)_2$ | 21.2 | 96 |
| Comparative Example 1 | Mixed suspension | UHPA SB1 | $Mg(OH)_2$ | 7 | 96 |
| Comparative Example 2 | Mixed Suspension | UHPA SB1 | $Mg(OH)_2$ | 22.3 | 23 |

As can be seen from the results, by utilizing the process of the invention higher loadings are possible for the spray dryer, whilst maintain the required high conversion percentages.

The Comparative Examples show that when the magnesium suspension is properly blended with the aluminum suspension before being pumped into an atomizer of a spray dryer that a low weight loading occurs with a high conversion rate (Comparative Example 1). If on the other hand, one increased the weight loading by lessening the time that the magnesium suspension and the aluminum suspensions are blended, the weight loading increases but the percentage conversion decreases drastically. (Comparative Example 2). The inventors have found that by feeding the magnesium suspension and the aluminum suspension independently into a spray dryer nozzle to form a mixed magnesium, aluminum suspension in the spray dryer nozzle leads to the advantages shown in Examples 1 and 2.

Although specific embodiments of the invention have been described herein in some detail, this has been done solely for the purposes of explaining the various aspects of the invention, and is not intended to limit the scope of the invention as defined. Those skilled in the art will understand that the embodiments shown and described are exemplary, and various other substitutions, alterations and modifications, including but not limited to those design alternatives specifically discussed herein, may be made in the practice of the invention without departing from its scope.

What is claimed is:

1. A process for producing a magnesium aluminate spinel comprising the following steps:
   i) preparing a magnesium suspension containing a magnesium compound;
   ii) preparing an aluminum suspension containing an aluminum compound;
   iii) feeding the magnesium suspension and aluminum suspension independently into a spray dryer nozzle to form a mixed magnesium, aluminum suspension;
   iv) feeding the mixed magnesium, aluminium suspension from the spray dryer nozzle into a spray dryer to form a mixed magnesium and aluminum compound; and
   v) calcining the mixed magnesium and aluminum compound to generate a magnesium aluminate spinel.

2. The process according to claim 1, wherein the magnesium suspension and the aluminum suspension are fed into the spray dryer by a spray dryer nozzle comprising at least two inlets that allows the magnesium suspension and the aluminum suspension to be fed independently into the spray dryer nozzle where they are combined and fed out into the spray dryer as a mixed magnesium aluminum suspension.

3. The process according to claim 1 wherein a pump system is used to feed the magnesium and aluminum suspensions independently into the spray dryer nozzle.

4. The process according to claim 1, wherein the aluminum compound comprises aluminum oxyhydroxide, aluminum oxide, aluminum hydroxide, or mixtures thereof.

5. The process according to claim 1, wherein the aluminum compound is milled prior to preparing the suspension in step ii).

6. The process according to claim 1, wherein an acidic solution is added to the alumina suspension in step ii) such that the alumina suspension has a pH of 3 to 5.

7. The process according to claim 1, wherein the magnesium compound includes magnesium oxides and magnesium salts.

8. The process according to claim 7, wherein the magnesium compound is magnesium oxide or magnesium hydroxide.

9. The process according to claim 1, wherein the magnesium suspension in step i) has a pH of about 8 to 9.

10. The process according to claim 1, wherein a base is added to the alumina suspension in step ii) and to the magnesium suspension in step i) after about 30 minutes of the formation of the respective suspensions to increase the pH of the respective suspensions to a pH of 8 to 10.

11. The process according to claim 1, wherein the magnesium suspension is dispersed for a period of 20 to 50 min.

12. The process according to claim 1, wherein the magnesium suspension is dispersed for a period of 25 to 35 min.

13. The process according to claim 1, wherein weight loadings of the mixed suspensions of higher than 10% are achieved when spray drying in step iv).

14. The process according to claim 13, wherein the conversion rate to spinel is equal to or greater than 95%.

15. The process according to claim 3, wherein the pumping rates of the magnesium suspension and the alumina suspension can be adjusted.

* * * * *